United States Patent
Ogawa et al.

(10) Patent No.: US 11,091,150 B2
(45) Date of Patent: Aug. 17, 2021

(54) VEHICLE CONTROL DEVICE

(71) Applicant: Mazda Motor Corporation, Hiroshima (JP)

(72) Inventors: Daisaku Ogawa, Hiroshima (JP); Osamu Sunahara, Hiroshima (JP); Yasunori Takahara, Hiroshima (JP); Chikako Ohisa, Aki-gun (JP); Yuichiro Akiya, Hiroshima (JP); Atsushi Yamasaki, Hiroshima (JP); Keiichi Hiwatashi, Aki-gun (JP); Daisuke Umetsu, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 182 days.

(21) Appl. No.: 16/489,452

(22) PCT Filed: Mar. 9, 2018

(86) PCT No.: PCT/JP2018/009226
§ 371 (c)(1),
(2) Date: Aug. 28, 2019

(87) PCT Pub. No.: WO2018/168694
PCT Pub. Date: Sep. 20, 2018

(65) Prior Publication Data
US 2020/0070813 A1    Mar. 5, 2020

(30) Foreign Application Priority Data
Mar. 17, 2017 (JP) .............................. JP2017-052428

(51) Int. Cl.
*B60W 30/045* (2012.01)
*B60W 10/06* (2006.01)
(Continued)

(52) U.S. Cl.
CPC .......... *B60W 30/045* (2013.01); *B60W 10/06* (2013.01); *B60W 10/10* (2013.01);
(Continued)

(58) Field of Classification Search
CPC ............... B60W 10/06; B60W 30/034; B60W 30/18145; B60W 30/1882;
(Continued)

(56) References Cited

U.S. PATENT DOCUMENTS

2005/0278077 A1    12/2005   Shin et al.

FOREIGN PATENT DOCUMENTS

| JP | 2009-40329 A | 2/2009 |
| JP | 2012-136098 A | 7/2012 |

(Continued)

OTHER PUBLICATIONS

International Search Report and Written Opinion dated Jun. 5, 2018 for PCT/JP2018/009226 filed on Mar. 9, 2018, 9 pages including English Translation of the International Search Report.

*Primary Examiner* — Hung Q Nguyen
*Assistant Examiner* — Mark L. Greene
(74) *Attorney, Agent, or Firm* — Xsensus LLP

(57) ABSTRACT

A vehicle control device includes an engine (10), an engine control mechanism that controls an engine torque, and a PCM (50) that performs vehicle posture control for generating vehicle deceleration by controlling the engine control mechanism to reduce the engine torque upon satisfaction of a condition that a vehicle is travelling and a steering angle-related value related to a steering angle of a steering device increases. When a driver performs an accelerator operation for reducing an accelerator opening during execution of vehicle posture control, the PCM (50) suppresses reduction of a generated torque of the engine due to the accelerator operation.

20 Claims, 10 Drawing Sheets

(51) Int. Cl.
  *B60W 10/10* (2012.01)
  *B60W 30/18* (2012.01)
  *B60W 30/188* (2012.01)
  *F02D 41/12* (2006.01)
(52) U.S. Cl.
  CPC .. *B60W 30/1882* (2013.01); *B60W 30/18145*
    (2013.01); *F02D 41/123* (2013.01); *B60W*
      *2510/20* (2013.01); *F02D 2200/0404*
    (2013.01); *F02D 2200/0406* (2013.01); *F02D*
    *2200/602* (2013.01); *F02D 2250/18* (2013.01)
(58) Field of Classification Search
  CPC .............. B60W 2510/20; F02D 41/123; F02D
        2200/0404; F02D 2200/0406; F02D
                2250/18
  See application file for complete search history.

(56) References Cited

FOREIGN PATENT DOCUMENTS

| | | |
|---|---|---|
| JP | 2014-80150 A | 5/2014 |
| JP | 2014-166014 A | 9/2014 |

VEHICLE CONTROL DEVICE

CROSS-REFERENCE TO RELATED APPLICATIONS

The present application is based on PCT filing PCT/JP2018/009226, filed Mar. 9, 2018, which claims priority to JP 2017-052428, filed Mar. 17, 2017, the entire contents of each are incorporated herein by reference.

TECHNICAL FIELD

The present invention relates to a vehicle control device and, more particularly, to a vehicle control device that achieves a desired vehicle posture (vehicle behavior) by executing engine control.

BACKGROUND ART

There is a conventionally known technique (for example, a side slip prevention device) that controls the behavior of a vehicle in a safe direction when the behavior of the vehicle becomes unstable due to a slip or the like. Specifically, there is a known technique that detects occurrence of understeer or oversteer behavior in the vehicle when, for example, the vehicle corners and provides the vehicle with appropriate deceleration so as to suppress the behavior.

On the other hand, there is a known vehicle motion control device that adjusts loads applied to front wheels that are steering wheels by adjusting deceleration during cornering so that a series of driver's operations (such as braking, steering, acceleration, and releasing of steering) when a vehicle in normal travel states corners becomes natural and stable, unlike control for improving safety in travel states in which vehicle behavior becomes unstable as described above.

In addition, there is proposed a vehicle behavior control device that quickly generates deceleration in a vehicle when the driver starts a steering operation by reducing the vehicle driving force (torque) according to yaw rate-rated amounts (for example, yaw acceleration corresponding to the driver's steering operation so as to apply sufficient loads to the front wheels that are steering wheels (see, for example, patent document 1). This vehicle behavior control device increases the friction force between the front wheels and the road surface by quickly applying loads to the front wheels at the start of a steering operation and increases the cornering force of the front wheels, thereby improving the head turn-around property at the initial stage when entering a curve and a response (that is, steering stability) to a steering operation. This achieves vehicle behavior as intended by the driver.

CITATION LIST

Patent Literature

PTL 1: JP-A-2014-166014

SUMMARY OF INVENTION

Technical Problem

By the way, for example, if the driver performs an accelerator operation for reducing an accelerator opening when the engine torque is reduced by vehicle posture control as described in PTL 1 according to a steering operation by the driver (typically, when the vehicle is turning), the engine torque is normally reduced in response to the reduction of the accelerator opening. As a result, the controllability of vehicle posture control degrades and desired vehicle behavior cannot be achieved.

The present invention addresses the above problem of the prior art with an object of providing a vehicle control device capable of appropriately suppressing the reduction of the engine torque due to, for example, an acceleration operation during execution of vehicle posture control.

Solution to Problem

To achieve the above object, according to the present invention, there is provided a vehicle control device including an engine; an engine control mechanism that controls a generated torque of the engine; and control means that performs vehicle posture control for generating vehicle deceleration by controlling the engine control mechanism to reduce the generated torque of the engine upon satisfaction of a condition that a vehicle is travelling and a steering angle-related value related to a steering angle of a steering device increases, in which, when a driver performs an accelerator operation for reducing an accelerator opening during execution of the vehicle posture control, the control means suppresses reduction of the generated torque of the engine due to the accelerator operation.

According to the present invention configured as described above, when the driver performs an accelerator operation for reducing the accelerator opening during the execution of the vehicle posture control, reduction of the generated torque (engine torque) of the engine due to the accelerator operation is suppressed, thereby suppressing the degradation of the controllability of vehicle posture control. That is, the engine torque controlled by the vehicle posture control can be ensured. Therefore, even when the driver performs an operation for reducing the accelerator opening during the vehicle posture control, the desired vehicle behavior can be appropriately achieved.

According to the present invention, preferably, the control means continues suppressing the reduction of the generated torque due to the accelerator operation until the vehicle posture control ends.

According to the present invention configured as described above, the degradation of the controllability of the vehicle posture control can be surely suppressed.

According to the present invention, preferably, the control means suppresses the reduction of the generated torque due to the accelerator operation by at least one of prohibiting the reduction of the generated torque due to the accelerator operation, delaying a start of the reduction of the generated torque due to the accelerator operation, reducing a reduction speed of the generated torque due to the accelerator operation, and reducing a reduction amount of the generated torque due to the accelerator operation.

According to the present invention configured as described above, the reduction of the engine torque due to the reduction of the accelerator opening can be effectively suppressed.

According to the present invention, when the accelerator operation performed during the vehicle posture control is accompanied by execution of fuel cut control of the engine, the control means preferably suppresses the reduction of the generated torque due to the accelerator operation by suppressing the execution of the fuel cut control.

According to the present invention configured as described above, when an execution condition of the fuel cut control is satisfied by the accelerator operation by the driver during the vehicle posture control, the reduction of the engine torque due to the fuel cut control can be appropriately suppressed. Therefore, the degradation of the controllability of the vehicle posture control due to the fuel cut control can be suppressed.

According to the present invention, preferably, the control means starts the fuel cut control a predetermined time after the execution condition of the fuel cut control is satisfied and, when the accelerator operation is accompanied by the execution of the fuel cut control, if the accelerator operation is performed during the vehicle posture control, the control means suppresses the reduction of the generated torque due to the accelerator operation by making the predetermined time longer than if the accelerator operation is not performed during the vehicle posture control.

According to the present invention configured as described above, the reduction of the engine torque due to the fuel cut control can be effectively suppressed during the vehicle posture control.

According to the present invention, preferably, the control means performs control for reducing the generated torque while keeping fuel supply to the engine until the predetermined time elapses after the execution condition of the fuel cut control is satisfied and, after the control, starts the fuel cut control and, when the accelerator operation is accompanied by the execution of the fuel cut control, if the accelerator operation is performed during the vehicle posture control, the control means suppresses the reduction of the generated torque due to the accelerator operation by at least one of delaying a start of the reduction of the generated torque in the predetermined time, reducing a reduction speed of the generated torque in the predetermined time, and reducing a reduction amount of the generated torque in the predetermined time in addition to by making the predetermined time longer if the accelerator operation is not performed during the vehicle posture control.

According to the present invention configured as described above, the degradation of the controllability of the vehicle posture control can be suppressed while ensuring the reduction of the engine torque to some extent before the fuel cut control for suppressing a torque shock caused by the fuel cut control.

According to the present invention, preferably, the control means does not suppress the reduction of the generated torque due to the accelerator operation when an operation amount or an operation speed that corresponds to the accelerator operation is more than or equal to a predetermined value.

According to the present invention configured as described above, even during the vehicle posture control, when the driver performs an accelerator operation with a relatively strong intention, the reduction of the engine torque is not suppressed. This enables appropriate reflection of the driver's will.

According to the present invention, preferably, the control means does not suppress the reduction of the generated torque due to the accelerator operation when the vehicle travels downhill.

According to the present invention configured as described above, when the vehicle travels downhill even during the vehicle posture control, the reduction of the engine torque is not suppressed. This can appropriately prioritize the driver's will to decelerate the vehicle when the vehicle travels downhill.

According to the present invention, preferably, the vehicle has a transmission and the control means does not suppress the reduction of the generated torque due to the accelerator operation while the transmission performs a shift to a lower gear or until a predetermined time elapses after the transmission performs the shift to the lower gear.

According to the present invention configured as described above, even during the vehicle posture control, the reduction of the engine torque is not suppressed while a shift to a low speed side is performed. This can appropriately prioritize the driver's will to decelerate the vehicle by a gear shift (typically, a request for engine braking).

According to another aspect of the present invention, there is provided a vehicle control device including an engine; accelerator opening detection means that detects an accelerator opening; an engine control mechanism that controls a generated torque of the engine; and control means that performs vehicle posture control for generating vehicle deceleration by controlling the engine control mechanism to reduce the generated torque of the engine upon satisfaction of a condition that a vehicle is travelling and a steering angle-related value related to a steering angle of a steering device increases, in which, when the accelerator opening detection means detects an accelerator operation for reducing the accelerator opening during execution of the vehicle posture control, the control means suppresses reduction of the generated torque of the engine due to the accelerator operation.

According to the present invention configured as described above, it is possible to appropriately suppress the degradation of the controllability of vehicle posture control due to the reduction of the engine torque according to the reduction of the accelerator opening.

According to another aspect of the present invention, there is provided a vehicle control device including an engine; an engine control mechanism that controls a generated torque of the engine; and control means that performs vehicle posture control for generating vehicle deceleration by controlling the engine control mechanism to reduce the generated torque of the engine upon satisfaction of a condition that a vehicle is travelling and a steering angle-related value related to a steering angle of a steering device increases, in which, the control means performs fuel cut control of engine when a predetermined fuel cut condition is satisfied and the control means suppresses the execution of the fuel cut control when the fuel cut condition is satisfied during execution of the vehicle posture control.

According to the present invention configured as described above, it is possible to appropriately suppress the degradation of the controllability of the vehicle posture control due to the fuel cut control.

According to another aspect of the present invention, there is provided a vehicle control device including a driving source that generates a torque as a driving force for vehicle travel; a driving source control mechanism that controls a generated torque of the driving source; and control means that performs vehicle posture control for generating vehicle deceleration by controlling the driving source control mechanism to reduce the generated torque of the driving source upon satisfaction of a condition that a vehicle is travelling and a steering angle-related value related to a steering angle of a steering device increases, in which, when a driver performs an accelerator operation for reducing an accelerator opening during execution of the vehicle posture control, the control means suppresses reduction of the generated torque of the driving source due to the accelerator operation.

According to the present invention configured as described above, when the driver performs an accelerator operation for reducing the accelerator opening during the vehicle posture control, since the reduction of the generated torque of the driving source due to the accelerator operation is suppressed, the degradation of the controllability of the vehicle posture control can be suppressed.

According to another aspect of the present invention, there is provided a vehicle control device including an engine; an engine control mechanism that controls a generated torque of the engine; and control means that performs vehicle posture control for generating vehicle deceleration by controlling the engine control mechanism to reduce the generated torque of the engine upon satisfaction of a condition that a vehicle is travelling and a steering angle-related value related to a steering angle of a steering device increases, in which, when a request for reducing the generated torque of the engine is issued independently of the vehicle posture control during execution of the vehicle posture control, the control means suppresses reduction of the generated torque of the engine based on the request.

According to the present invention configured as described above, when the request for reducing the generated torque of the engine is issued during the vehicle posture control, since the reduction of the generated torque based on the request is suppressed, the degradation of the controllability of the vehicle posture control can be suppressed.

Advantageous Effects of Invention

In a vehicle control device according to the present invention, the reduction of an engine torque based on, for example, an accelerator operation can be appropriately suppressed during the execution of vehicle posture control.

DESCRIPTION OF EMBODIMENTS

Vehicle control devices according to embodiments of the present invention will be described below with reference to the attached drawings.

<System Structures>

Figure 1:
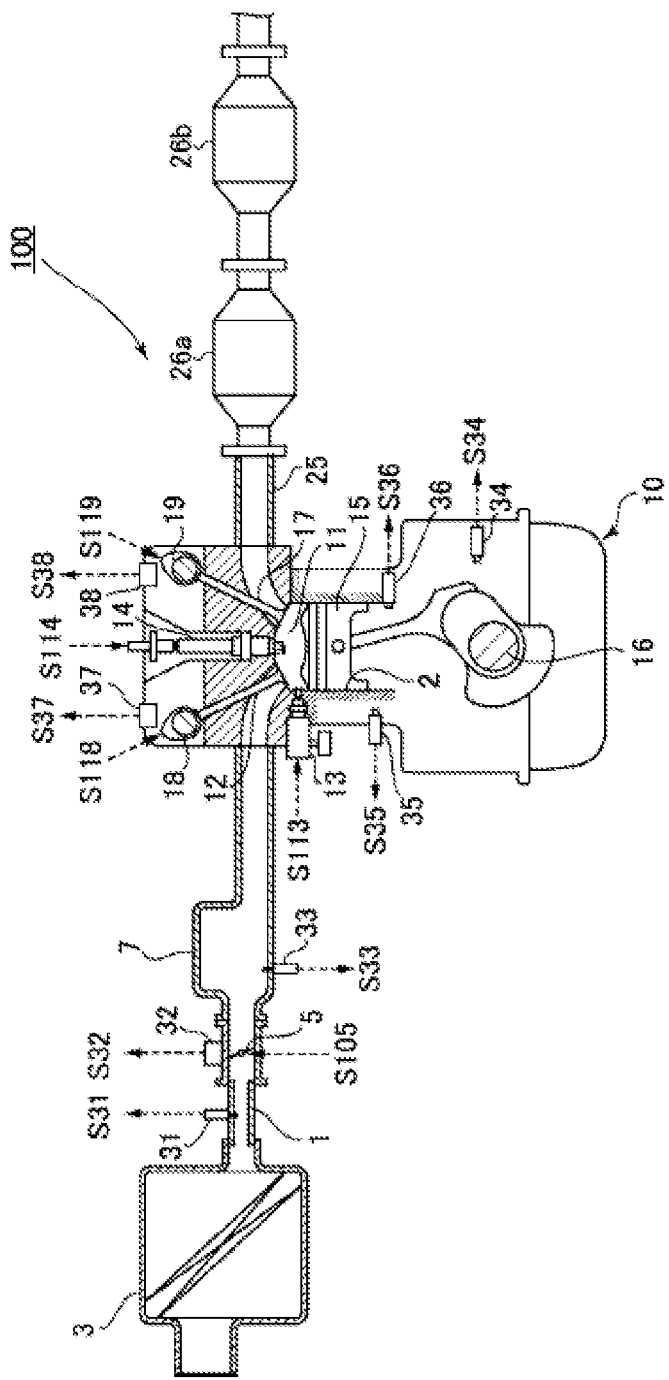
FIG. 1 is a schematic structural diagram illustrating an engine system to which a vehicle control device according to an embodiment of the present invention has been applied.

First, an engine system to which a vehicle control device according to an embodiment of the present invention has been applied will be described with reference to FIG. 1 and FIG. 2. FIG. 1 is a schematic structural diagram illustrating the engine system to which the vehicle control device according to the embodiment of the present invention has been applied and FIG. 2 is a block diagram illustrating the electric structure of the vehicle control device according to the embodiment of the present invention.

Figure 2:
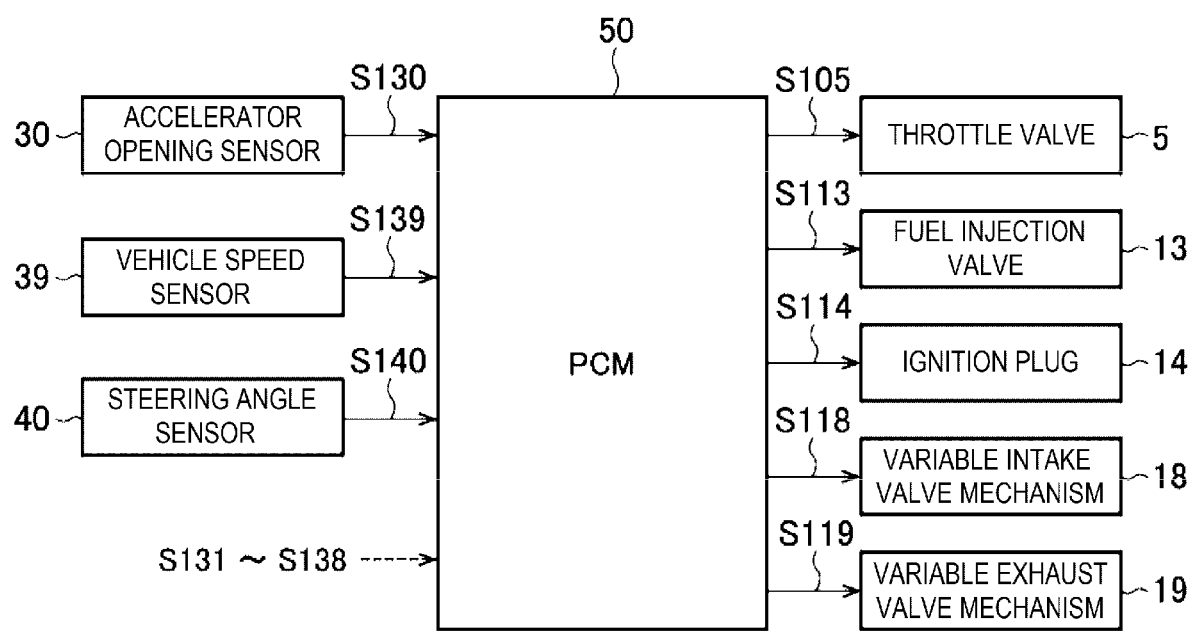
FIG. 2 is a block diagram illustrating an electric structure of the vehicle control device according to the embodiment of the present invention.

As illustrated in FIG. 1 and FIG. 2, an engine system 100 mainly includes an intake passage 1 through which intake air (air) introduced from the outside passes, an engine 10 (specifically, a gasoline engine) that burns an air-fuel mixture of the intake air supplied through the intake passage 1 and fuel supplied through a fuel injection valve 13, which will be described later, and generates the power of a vehicle, an exhaust passage 25 through which exhaust gas generated by combustion in the engine 10 is exhausted, sensors 30 to 40 that detect various states about the engine system 100 and a PCM (Power-train Control Module) 50 that controls the entire engine system 100.

In the intake passage 1, an air cleaner 3 that purifies the intake air introduced from the outside, a throttle valve 5 that adjusts the amount (intake air amount) of the intake air passing therethrough, and a surge tank 7 that temporarily stores the intake air to be supplied to the engine 10 are disposed in this order from the upstream side.

The engine 10 mainly includes intake valves 12 that introduce the intake air supplied through the intake passage 1 into combustion chambers 11, the fuel injection valves 13 that inject fuel toward the combustion chambers 11, ignition plugs 14 that ignite air-fuel mixtures of the intake air and the fuel supplied into the combustion chambers 11, pistons 15 that reciprocate due to the combustion of the air-fuel mixtures in the combustion chambers 11, a crankshaft 16 that rotates due to the reciprocating motion of the pistons 15, and exhaust valves 17 through which the exhaust gas generated by the combustion of the air-fuel mixtures in the combustion chambers 11 is exhausted to the exhaust passage 25.

In addition, the engine 10 is configured so that the operation timings (corresponding to the phases of valves) of the intake valves 12 and the exhaust valves 17 can be changed by variable intake valve mechanisms 18 and variable exhaust valve mechanisms 19 as variable valve timing mechanisms. Various known types can be applied as the variable intake valve mechanisms 18 and the variable exhaust valve mechanisms 19. The operation timings of the intake valves 12 and the exhaust valves 17 can be changed by, for example, mechanisms configured electromagnetically or hydraulically.

The exhaust passage 25 is mainly provided with exhaust purification catalysts 26a and 26b having the function of purifying exhaust gas, such as, for example, a NOx catalyst, three-way catalyst, or oxidation catalyst. In the following description, the exhaust purification catalysts 26a and 26b may be simply referred to as "the exhaust purification catalysts 26" when they are not distinguished.

In addition, the engine system 100 is provided with the sensors 30 to 40 that detect various states about the engine system 100. These sensors 30 to 40 will be specifically described below. The accelerator opening sensor 30 detects an accelerator opening that is the opening of an accelerator pedal, which corresponds to the amount of depression of the accelerator pedal by the driver. The air flow sensor 31 detects the amount of intake air, which corresponds to the flowrate of intake air passing through the intake passage 1. The throttle opening sensor 32 detects the throttle opening that is the opening of the throttle valve 5. The pressure sensor 33 detects the intake manifold pressure (pressure of an intake manifold), which corresponds to the pressure of intake air to be supplied to the engine 10. The crank angle sensor 34 detects the crank angle of the crankshaft 16. The water temperature sensor 35 detects the water temperature that is the temperature of cooling water for cooling the engine 10. The temperature sensor 36 detects the in-cylinder temperature that is the temperature in the cylinder of the engine 10. The cam angle sensors 37 and 38 detect operation timings including the closing timings of the intake valve 12 and the exhaust valve 17, respectively. The vehicle speed sensor 39 detects the speed (vehicle speed) of the vehicle. The steering angle sensor 40 detects the rotation angle (steering angle) of the steering wheels of a steering device (not illustrated). The various sensors 30 to 40 output detection signals S130 to S140 corresponding to detected parameters to the PCM 50.

The PCM 50 controls the components in the engine system 100 based on the detection signals S130 to S140 input from the various sensors 30 to 40 described above. Specifically, the PCM 50 controls the opening and closing timing and the throttle opening of the throttle valve 5 by supplying a control signal S105 to the throttle valve 5, controls the fuel injection amount and the fuel injection timing by supplying a control signal S113 to the fuel injection valve 13, controls the ignition timing by supplying a control signal S114 to the ignition plug 14, controls the operation timings of the intake valve 12 and the exhaust valve 17 by supplying control signals S118 and S119 to the variable intake valve mechanism 18 and the variable exhaust valve mechanism 19, respectively. It should be noted here that the throttle valve 5, the fuel injection valve 13, the ignition plug 14, the variable intake valve mechanism 18, and the variable exhaust valve mechanism 19 correspond to examples of "the engine control mechanisms" in the present invention.

In the embodiment, upon satisfaction of the conditions (vehicle posture control start condition/execution condition) that the vehicle is traveling and a steering angle-related value (typically, the steering speed) related to the steering angle of the steering wheels increases, the PCM 50 executes vehicle posture control (in other words, torque reduction control) for controlling the posture of the vehicle by reducing the generated torque (engine torque) of the engine 10 to generate vehicle deceleration. In particular, according to the embodiment, when the driver performs an accelerator operation for reducing the accelerator opening during the execution of such vehicle posture control, the PCM 50 suppresses (limits) the reduction of the engine torque due to the accelerator operation. In addition, when the driver completely releases the depression of the accelerator pedal to set the accelerator opening to substantially 0 in a typical case, the PCM 50 normally performs fuel cut control that stops fuel supply to the engine 10. However, when such an accelerator operation is performed during vehicle posture control, the PCM 50 suppresses (limits) the execution of the fuel cut control.

The PCM 50 described above is formed by a computer including a CPU (Central Processing Unit), various programs (including a basic control program such as an OS and application programs started under the OS to achieve specific functions) to be interpreted and executed by the CPU, and internal memories such as a ROM and a RAM which the programs and various types of data are stored. In addition, the PCM 50 is configured to function as "the control means" in the present invention.

<Control Performed in Embodiments>

Next, specific embodiments (first and second embodiments) of control to be performed by the PCM 50 in the present invention will be described.

First Embodiment

Figure 3:
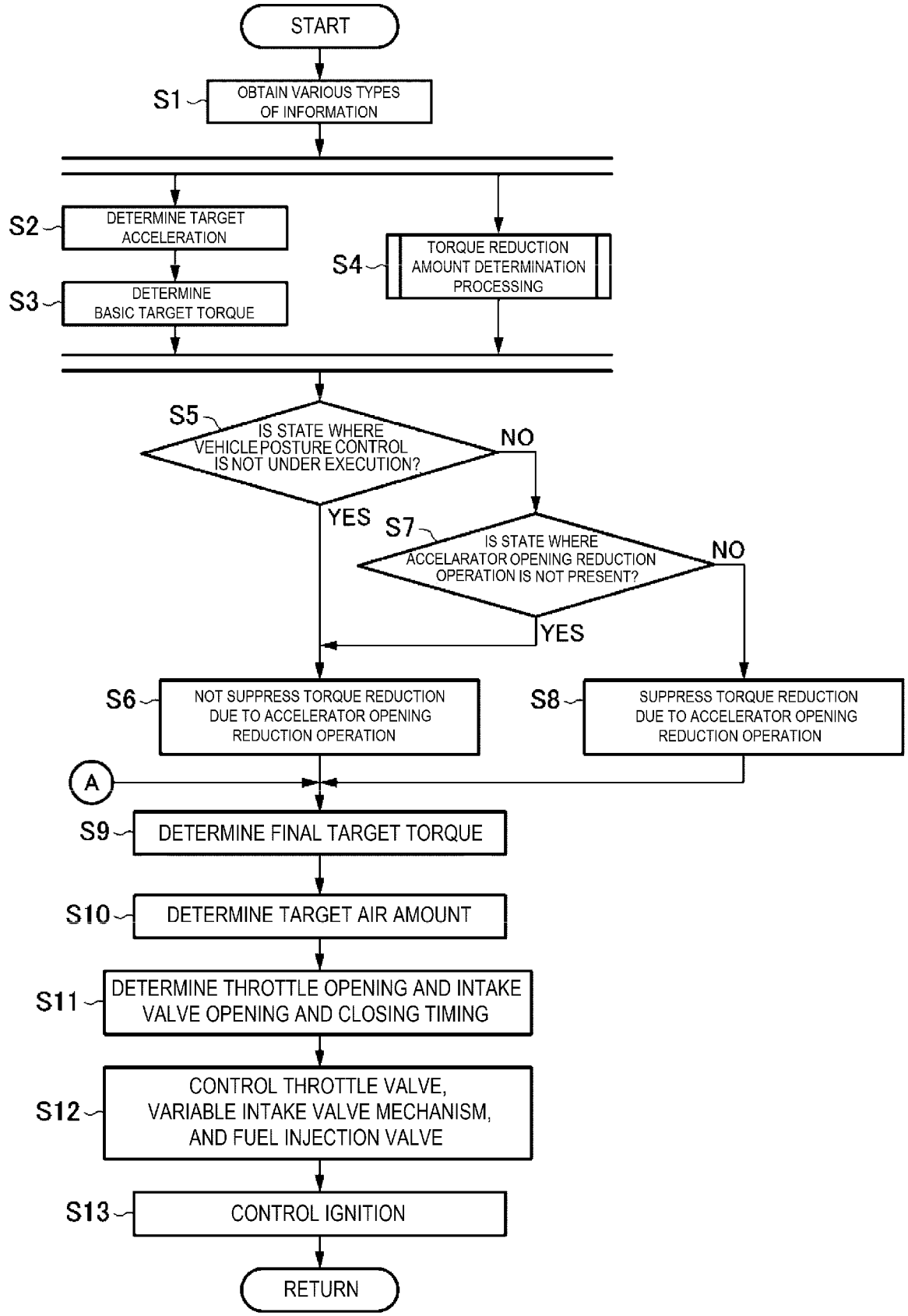
FIG. 3 is a flowchart illustrating engine control processing according to a first embodiment of the present invention.
Figure 4:
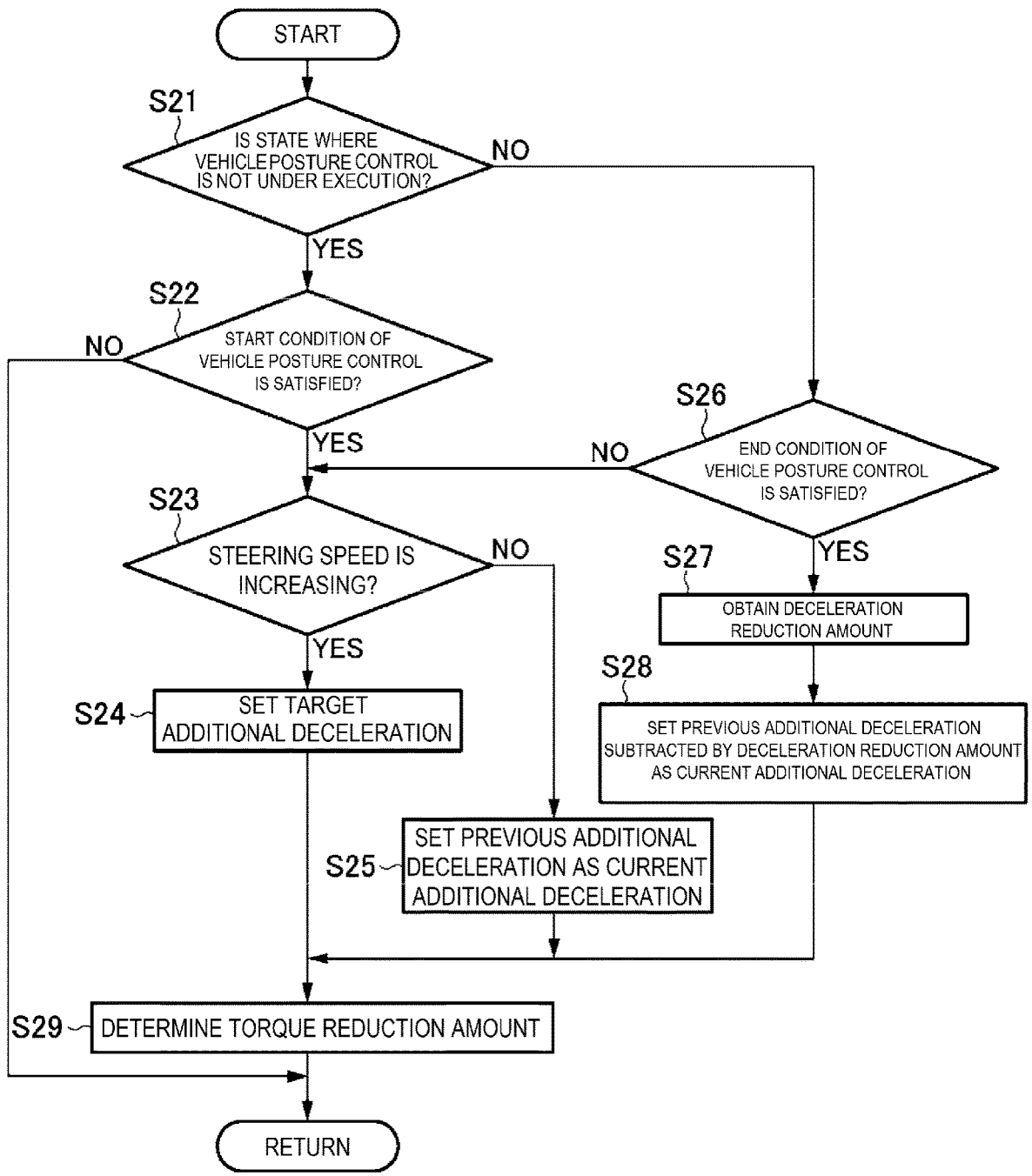
FIG. 4 is a flowchart illustrating torque reduction amount determination processing according to first embodiment of the present invention.
Figure 5:
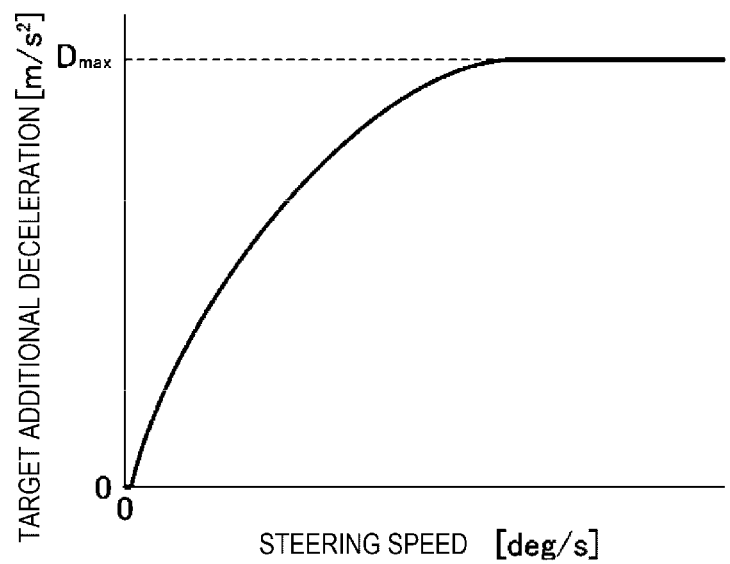
FIG. 5 is a map illustrating the relationship between target additional deceleration and steering speed according to the first embodiment of the present invention.

Control performed by the PCM 50 in the first embodiment of the present invention will be described specifically with reference to FIGS. 3 to 5. FIG. 3 is a flowchart illustrating engine control processing according to the first embodiment of the present invention. FIG. 4 is a flowchart illustrating torque reduction amount determination processing according to the first embodiment of the present invention. FIG. 5 is a map illustrating the relationship between target additional deceleration and steering speed according to the first embodiment of the present invention.

The engine control processing in FIG. 3 is started when ignition of the c is turned on and the power to the control device of the engine is turned on and the engine control processing is performed repeatedly. In addition, this engine control processing is executed while the vehicle travels.

When the engine control processing has been started, the PCM 50 obtains the operational state of the vehicle in step S1 as illustrated in FIG. 3. Specifically, the PCM 50 obtains, as the operational state, the detection signals S130 to S140 output by the various sensors 30 to 40 including the engine rotation speed corresponding to the crank angle detected by the crank angle sensor 34, the accelerator opening detected by the accelerator opening sensor 30, the vehicle speed detected by the vehicle speed sensor 39, the steering angle detected by the steering angle sensor 40, the gear stage currently set in the automatic transmission of the vehicle, and the like.

Next, in step S2, the PCM 50 sets the target acceleration based on the operational state of the vehicle including the operation of the accelerator pedal obtained in step S1. Specifically, the PCM 50 selects an acceleration characteristic map corresponding to the current vehicle speed and gear stage from acceleration characteristic maps (created in advance and stored in a memory or the like) defined for various vehicle speeds and various gear stages and determines the target acceleration corresponding to the current accelerator opening with reference to the selected acceleration characteristic map.

Next, in step S3, the PCM 50 determines the basic target torque of the engine 10 that achieves the target acceleration determined in step S2. In this case, the PCM 50 determines the basic target torque within the range of the torque that can be output by the engine 10, based on the current vehicle speed the gear stage, the road surface gradient, a road surface μ, and the like.

In addition, concurrently with the processes in steps S2 and S3, the processing of step S4 is performed. In step S4, the PCM 50 executes torque reduction amount determination processing that determines the torque reduction amount in the vehicle posture control described above based on the steering angle of the steering wheels detected by the steering angle sensor 40. The torque reduction amount determination processing will be described in detail later.

Next, in step S5, the PCM 50 decides whether it is a state in which vehicle posture control is not currently under execution. As a result of the decision, when vehicle posture control is under execution (No in step S5), the PCM 50 proceeds to step S7 and further decides whether an accelerator operation for reducing the accelerator opening is not executed by the driver based on the accelerator opening obtained in step S1. As a result of the decision, when an accelerator operation for reducing the accelerator opening is executed by the driver (No in step S7), the PCM 50 proceeds to step S8 and suppresses the reduction of the engine torque by the reduction of the accelerator opening. This suppresses the degradation of controllability of c posture control because of the reduction of the engine torque due to the reduction of the accelerator opening. It should be noted here that a specific method for suppressing the reduction of the engine torque be described later.

In contrast, when it is a state in which vehicle posture control is not under execution (Yes in step S5) or when the driver does not perform an accelerator operation for reducing the accelerator opening (Yes in step S7), the PCM 50 proceeds to step S6 and does not suppress the reduction of the engine torque due to the reduction of the accelerator opening. That is, the engine torque is reduced due to the reduction of the accelerator opening.

After step S6 and step S8 described above, in step S9, the PCM 50 determines the final torque based on the basic target torque determined in step S3 and the torque reduction amount determined in the torque reduction amount determination processing in step S4. Specifically, when the torque reduction amount is determined in the torque reduction amount determination processing (corresponding to the case in which vehicle posture control is under execution), the PCM 50 determines the final target torque by subtracting the torque reduction amount from the basic target torque. When the driver performs an accelerator operation for reducing the accelerator opening, the basic target torque normally reduces according to the reduction of the accelerator opening. However, in the embodiment, the PCM 50 suppresses such reduction of the basic target torque during vehicle posture control and determines the final target torque by subtracting the torque reduction amount from the basic target torque to which the suppression has been applied. In contrast, when the torque reduction amount is not determined in the torque reduction amount determination processing (corresponding to the case in which vehicle posture control is not executed), the PCM 50 determines the basic target torque as the final target torque. In this case, the PCM 50 does not apply the suppression of the reduction of the engine torque due to the reduction of the accelerator opening to the basic target torque.

Next, the PCM 50 proceeds to step S10 and determines the target air amount and the target fuel amount that cause the engine 10 to output the final target torque determined in step S9. Here, the "air amount" is the amount of air introduced to the combustion chamber 11 of the engine 10. The filling efficiency that is the dimensionless quantity of this air amount may be used. Specifically, the PCM 50 calculates the target indicated torque obtained by adding the loss torque due to friction loss and pumping loss to the final target torque, calculates the target fuel amount required to generate this target indicated torque, and determines the target air amount based on the target fuel amount and the target equivalence ratio.

Next, in step S11, the PCM 50 determines the opening of the throttle valve 5 and the opening and closing timing of the intake valve 12 via the variable intake valve mechanism 18 in consideration of the air amount detected by the air flow sensor 31 so that the air of the target air amount determined in step S10 is introduced into the engine 10.

Next, in step S12, the PCM 50 controls the throttle valve 5 and the variable intake valve mechanism 18 based on the opening and the opening and closing timing of the intake valve 12 set in step S11 and controls the fuel injection valve 13 based on the target fuel amount calculated in step S10.

Next, in step S13, the PCM 50 sets the ignition timing so as to cause the engine 10 to out the final target torque based on the final target torque determined in step S9 and the actual air amount introduced to the combustion chamber 11 by controlling the throttle valve 5 and the variable intake valve mechanism 18 in step S11, and controls the ignition plug 14 so that ignition occurs at this ignition timing. After step S13, the PCM 50 ends the engine control processing.

Next, the torque reduction amount determination processing illustrated in FIG. 4 will be described. This torque reduction amount determination processing is performed in step S4 in FIG. 3.

After the torque reduction amount determination processing is started, the PCM 50 decides in step S21 whether it is a state in which vehicle posture control is not currently under execution. As a result of the decision, when vehicle posture control is not under execution (Yes in step S21), the PCM 50 proceeds to step S22 and decides whether the vehicle posture control start condition is satisfied. Specifically, the PCM 50 decides whether the change speed (the steering speed is preferably calculated based on the steering angle obtained in step S1) of the steering angle is more than or equal to a start threshold. As a result of the decision, when the change speed of the steering angle is more than or equal to the start threshold, that is, when the vehicle posture control start condition is satisfied (Yes in step S22), the PCM 50 proceeds to step S23. In contrast, when the change speed of the steering angle is less than the start threshold, that is, when the vehicle posture control start condition is not satisfied (No in step S22), the processing ends.

Next, in step S23, the PCM 50 decides whether the steering speed (change speed of the steering angle) is increasing. As a result of the decision, when the steering speed is increasing (Yes in step S23), the PCM 50 proceeds to step S24 and sets the target additional deceleration based on the steering speed. This target additional deceleration is the deceleration that is added to the vehicle according to the steering operation in order to accurately achieve the vehicle behavior intended by the driver.

Basically, the PCM 50 obtains the target additional deceleration corresponding to the current steering speed based on the relationship between the target additional deceleration and the steering speed illustrated in the map of FIG. 5. In FIG. 5, the horizontal axis indicates the steering speed and the vertical axis indicates the target additional deceleration. As illustrated in FIG. 5, as the steering speed is higher, the target additional deceleration corresponding to this steering speed asymptotically becomes closer to a predetermined upper limit (for example, 1 m/s$^2$). Specifically, as the steering speed is higher, the target additional deceleration becomes larger and the increase ratio of the increase amount becomes smaller.

In contrast, as a result of the decision in step S23, when the steering speed is not increasing (No in step S23), that is, when the steering speed reduces or does not change, the PCM 50 proceeds to step S25. In step S25, the PCM 50 determines the additional deceleration determined in the previous processing as the additional deceleration in the current processing.

In contrast, as a result of the decision in step S21, when vehicle posture control is under execution (No in step S21), the PCM 50 proceeds to step S26. In step S26, the PCM 50 decides whether the vehicle posture control end condition is satisfied. Specifically, the PCM 50 decides whether the change speed of the steering angle is less than a predetermined end threshold. As a result of the decision, when the change speed of the steering angle is more than or equal to the end threshold, that is, when the vehicle posture control end condition is not satisfied (No in step S26), the PCM 50 proceeds to step S23. In this case, the PCM 50 executes the processing of step S23 and subsequent steps described above to continue vehicle posture control.

In contrast, when the change speed of the steering angle is less than the end threshold, that is, when the vehicle posture control end condition is satisfied (Yes in step S26), the PCM 50 proceeds to step S27. In step S27, the PCM 50 obtains the amount (deceleration reduction amount) by which the additional deceleration determined in the previous processing is reduced from the current processing. In one example, the PCM 50 calculates the deceleration reduction amount based on the reduction rate according to the steering speed using the map as illustrated in FIG. 5 as in the target additional deceleration. In another example, the PCM 50 calculates the deceleration reduction amount based on a certain reduction rate (for example, 0.3 m/s$^3$) stored in advance in a memory or the like.

Next, in step S28, the PCM 50 determines the additional deceleration in the current processing by subtracting the deceleration reduction amount obtained in step S27 from the additional deceleration determined in the previous processing.

After step S24, S25, or S28, in step S29, the PCM 50 determines the torque reduction amount based on the current additional deceleration determined in step S24, S25, or S28. Specifically, the PCM 50 determines the torque reduction amount required to achieve the current additional deceleration based on the current vehicle speed, the gear stage, the road surface gradient, and the like acquired in step S1. After step S29, the PCM 50 ends the torque reduction amount determination processing and returns to the main routine.

When the target additional deceleration is determined in step S24 in FIG. 4, the additional deceleration in the current processing is preferably determined in the range in which the increase rate of the additional deceleration is less than or equal to a predetermined threshold (for example, 0.5 m/s$^3$). Specifically, when the increase rate from the additional deceleration determined in the previous processing to the target additional deceleration determined in step S24 of the current processing is less than or equal to the threshold, the PCM 50 determines the target additional deceleration determined in step S24 as the additional deceleration in the current processing. In contrast, when the change rate from the additional deceleration determined in the previous processing to the target additional deceleration determined in step S24 of the current processing is more than the threshold, the PCM 50 determines the value increased by the threshold from the additional deceleration determined in the previous processing until this processing time, as the additional deceleration in the current processing.

In addition, the engine control processing described above decides whether vehicle posture control is under execution and decides whether an acceleration opening reduction operation is performed after determining the basic target torque according to the target acceleration (step S3). After that, the reduction of the basic target torque due to the reduction of the accelerator opening is suppressed according to the decision results (steps S5 to S8). In another example, when the basic target torque is first determined in step S3, the engine control processing may decide whether vehicle posture control is under execution and whether an acceleration opening reduction operation is performed and, based on the decision results, the suppression of the reduction of the torque due to the reduction of the accelerator operating may be applied to the basic target torque.

According to the first embodiment described above, when the driver performs an accelerator operation for reducing the accelerator opening during the execution of vehicle posture control, the PCM 50 suppresses the reduction of the engine torque due to the accelerator operation. This can suppress the degradation of the controllability of vehicle posture control. That is, the engine torque controlled by vehicle posture control can be ensured. Therefore, even when the driver performs the reduction operation of the accelerator opening during vehicle posture control, desired vehicle behavior can be appropriately achieved.

Next, specific examples (first to fourth examples) of the suppression method for engine torque reduction due to the reduction operation of the accelerator operating according to the first embodiment of the present invention will be described with reference to FIG. 6 to FIG. 9.

Figure 6:
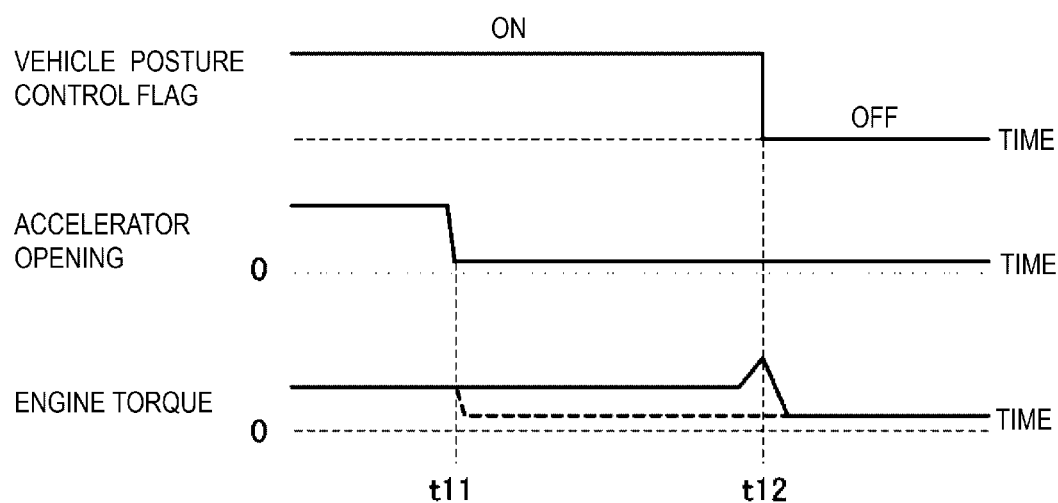
FIG. 6 is a timing chart illustrating a first example of a suppression method for engine torque reduction according to the first embodiment of the present invention.

FIG. 6 is a timing chart illustrating a first example of a suppression method for engine torque reduction according to the first embodiment of the present invention. FIG. 6 illustrates, from top to bottom, temporal changes of a vehicle posture control flag indicating whether vehicle posture control (turned on when vehicle posture control is under execution or turned off when vehicle posture control is not under execution) under execution, temporal changes of the accelerator opening, and temporal changes of the engine torque. In addition, in the graph indicating the engine torque in FIG. 6, the solid line indicates a graph in the first example of the first embodiment and the dashed line indicates a graph in a comparative example. The comparative example is an example in which the engine torque is reduced according to a reduction operation of the accelerator opening even during vehicle posture control. In other words, this is an example in which the reduction of the engine torque due to the reduction of the accelerator opening is not suppressed (the definition of the comparative example is the same in the following cases).

As illustrated in FIG. 6, it is assumed that the vehicle posture control flag is turned on and the engine torque is reduced by vehicle posture control before time t11. In this situation, the accelerator opening is significantly reduced at time t11. In the comparative example, the engine torque is reduced from time t11 according to the reduction of the accelerator opening. In contrast, in the first example of the first embodiment, since vehicle posture control is under execution at time t11, the PCM 50 suppresses the reduction of the engine torque due to the reduction of the accelerator opening. Particularly in the first example, the PCM 50 prohibits the reduction of the engine torque due to the reduction of the accelerator opening and keeps the engine torque reduced by vehicle posture control. The PCM 50 continues the prohibition of the reduction of the engine torque due to the reduction of the accelerator opening described above until the vehicle posture control flag is turned off (time t12), specifically until the engine torque is returned to the engine torque before the control by vehicle posture control. This can surely suppress the degradation of the controllability of vehicle posture control. Then, the PCM 50 releases the suppression of the reduction of the engine torque after time t12 so as to smoothly reduce the engine torque.

Figure 7:
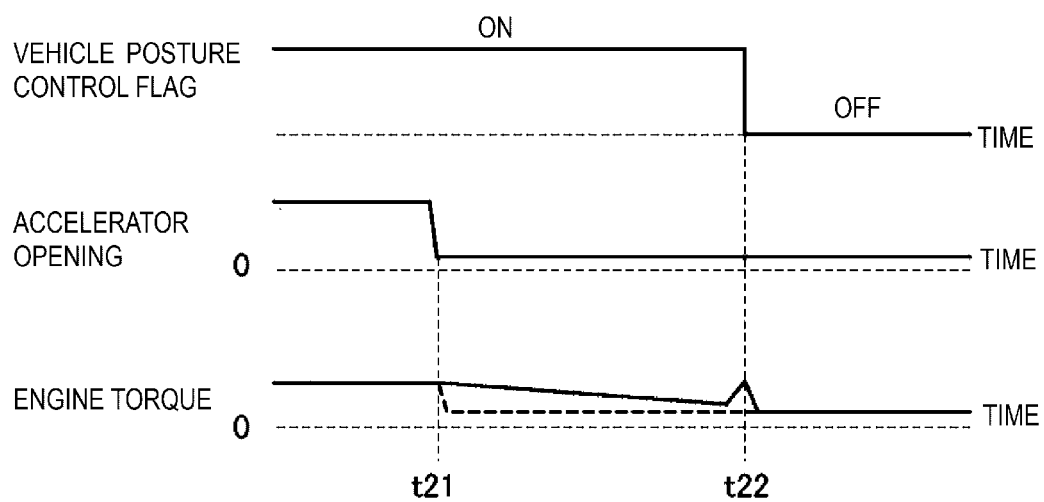
FIG. 7 is a timing chart illustrating a second example of the suppression method for engine torque reduction according to the first embodiment of the present invention.

Next, FIG. 7 is a timing chart illustrating a second example of the suppression method for engine torque reduction according to the first embodiment of the present invention. FIG. 7 also illustrates, from top to bottom, temporal changes of the vehicle posture control flag, temporal changes of the accelerator opening, and temporal changes of the engine torque. In addition, in the graph indicating the engine torque in FIG. 7, the solid line indicates a graph in the second example of the first embodiment and the dashed line indicates a graph in a comparative example. The control in the comparative example is the same as that illustrated in FIG. 6.

As illustrated in FIG. 7, it is assumed that the vehicle posture control flag is turned on and the engine torque is reduced by vehicle posture control before time t21. In this situation, the accelerator opening is significantly reduced at time t21. Since vehicle posture control is under execution at time t21 also in the second example of the first embodiment, the PCM 50 suppresses the reduction of the engine torque due to the reduction of the accelerator opening. Particularly in the second example, the PCM 50 reduces the engine torque more calmly than in the comparative example. Specifically, the PCM 50 makes the reduction speed of the engine torque significantly lower than the reduction speed that is appropriate for the reduction of the accelerator opening. The PCM 50 reduces the engine torque at such reduction speed until the vehicle posture control flag is turned off (time t22). This can suppress the degradation of the controllability of vehicle posture control while permitting torque changes according to the accelerator operation by the driver to some extent, that is, while reflecting the driver's will to some extent. Then, the PCM 50 releases the suppression of the reduction of the engine torque after time t22 so as to quickly reduce the engine torque.

Figure 8:
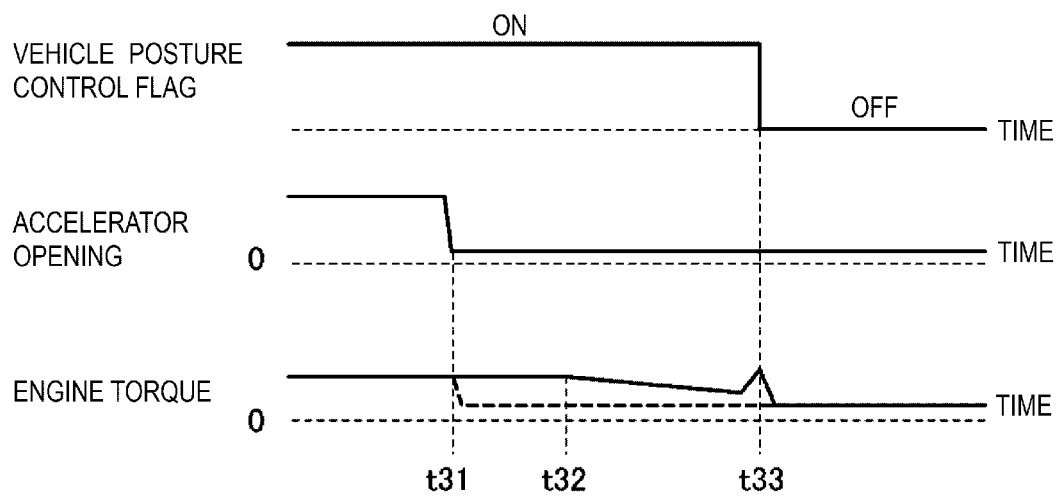
FIG. 8 is a timing chart illustrating a third example of the suppression method for engine torque reduction according to the first embodiment of the present invention.

Next, FIG. 8 is a timing chart illustrating a third example of the suppression method for engine torque reduction according to the first embodiment of the present invention. FIG. 8 also illustrates, from top to bottom, temporal changes of the vehicle posture control flag, temporal changes of the accelerator opening, and temporal changes of the engine torque. In addition, in the graph indicating the engine torque in FIG. 8, the solid line indicates a graph in the third example of the first embodiment and the dashed line indicates a graph in a comparative example. The control in the comparative example is the same as that illustrated in FIG. 6.

As illustrated in FIG. 8, it is assumed that the vehicle posture control flag is turned on and the engine torque is reduced by vehicle posture control before time t31. In this situation, the accelerator opening is significantly reduced at time t31. Since vehicle posture control is under execution at time t11 also in the third example of the first embodiment, the PCM 50 suppresses the reduction of the engine torque due to the reduction of the accelerator opening. Particularly in the third example, the PCM 50 delays the time at which the reduction of the engine torque due to the reduction of the accelerator opening is started. Specifically, the PCM 50 reduces the engine torque from time t32 some time after time t31 at which an accelerator operation for reducing the accelerator opening has been performed. In addition, when reducing the engine torque as described above, the PCM 50 reduces the engine torque more calmly than in the comparative example. That is, the PCM 50 makes the reduction speed of the engine torque significantly lower than the reduction speed that is appropriate for the reduction of the accelerator opening. The PCM 50 reduces the engine torque at such reduction speed until the vehicle posture control flag is turned off (time t33). This can also suppress the degradation of the controllability of vehicle posture control while permitting torque changes according to the accelerator operation by the driver to some extent, that is, while reflecting the driver's will to some extent. Then, the PCM 50 releases the suppression of the reduction of the engine torque after time t33 so as to quickly reduce the engine torque.

Figure 9:
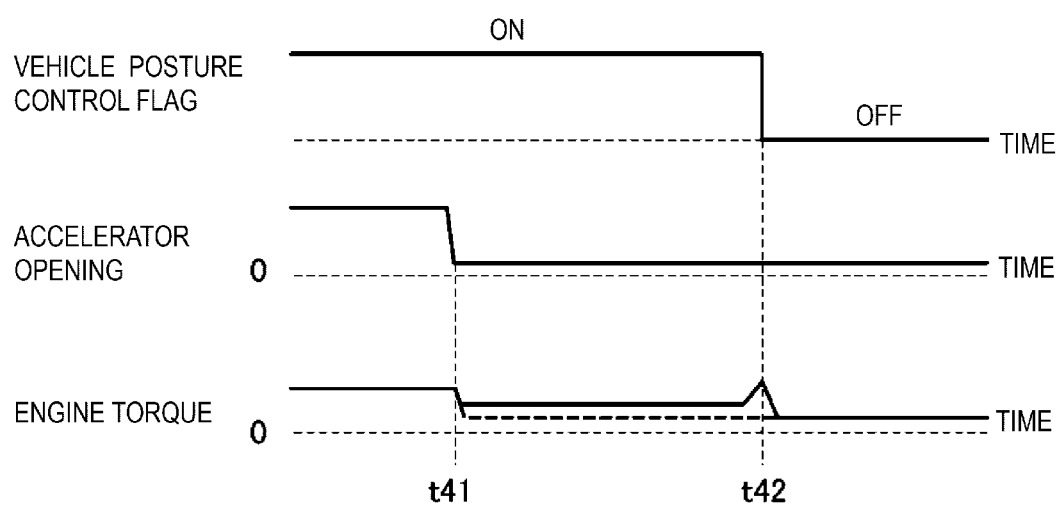
FIG. 9 is a timing chart illustrating a fourth example of the suppression method for engine torque reduction according to the first embodiment of the present invention.

Next, FIG. 9 is a timing chart illustrating a fourth example of the suppression method for engine torque reduction according to the first embodiment of the present invention, FIG. 9 also illustrates, from top to bottom, temporal changes of the vehicle posture control flag, temporal changes of the accelerator opening, and temporal changes of the engine torque. In addition, in the graph indicating the engine torque in FIG. 9, the solid line indicates a graph in the fourth example of the first embodiment and the dashed line indicates a graph in the comparative example. The control in the comparative example is the same as that illustrated in FIG. 6.

As illustrated in FIG. 9, it is assumed that the vehicle posture control flag is turned on and the engine torque is reduced by vehicle posture control before time t41. In this situation, the accelerator opening is significantly reduced at time t41. Since vehicle posture control is under execution at time t41 also in the fourth example of the first embodiment, the PCM 50 suppresses the reduction of the engine torque due to the reduction of the accelerator opening. In particular, in the fourth example, the PCM 50 makes the reduction amount of the engine torque smaller than in the comparative example. Specifically, the PCM 50 makes the reduction amount of the engine torque significantly smaller than the reduction amount appropriate for the reduction of the accelerator opening. The PCM 50 keeps the engine torque reduced by the reduction amount described above until the vehicle posture control flag is turned off (time t42). This can also suppress the degradation of the controllability of vehicle posture control while permitting torque changes according to the accelerator operation by the driver to some extent, that is, while reflecting the driver's will to some extent. Then, the PCM 50 releases the suppression of the reduction of the engine torque after time t42 so as to quickly reduce the engine torque.

It should be noted here ha the first to fourth examples of the first embodiment may be executed by combining them as appropriate. In particular, any two or more of delaying the start of the reduction of the engine torque due to the reduction of the accelerator opening, reducing the reduction speed of the engine torque due to the reduction of the accelerator opening, and reducing the reduction amount of the engine torque due to the reduction of the accelerator opening may be executed by combining them as appropriate.

Second Embodiment

Next, the second embodiment of the present invention will be described. The second embodiment is different from the first embodiment in that, when the driver performs an accelerator operation for reducing the accelerator opening during the execution of vehicle posture control, if this accelerator operation is accompanied by the execution of the fuel cut control of the engine 10, the PCM 50 suppresses the execution of the fuel cut control. That is, in the second embodiment, when the fuel cut condition is satisfied during vehicle posture control, the PCM 50 suppresses the execution of fuel cut control (fuel cut is referred to below as F/C as appropriate). This suppresses the reduction of the engine torque due to F/C control during vehicle posture control and suppresses the degradation of the controllability of the vehicle posture control.

It should be noted here that the control and processing that are different from those of the first embodiment will be mainly described below and the control and processing that are the same as those of the first embodiment are not described below as appropriate. That is, the control and processing not described here are the same as those of the first embodiment. This is true of the working effect.

Figure 10:
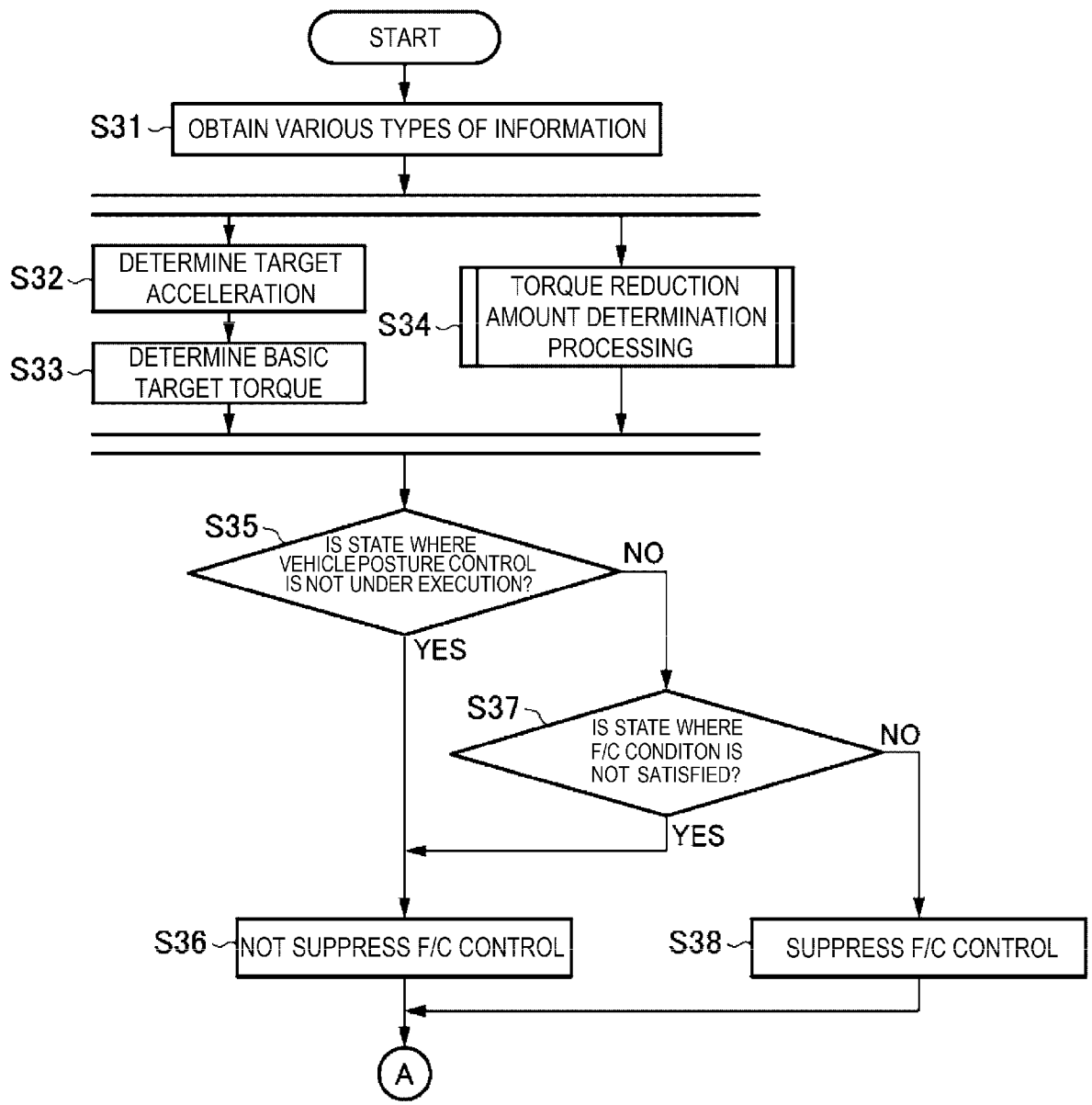
FIG. 10 is a flowchart illustrating engine control processing according to a second embodiment of the present invention.

FIG. 10 is a flowchart illustrating engine control processing in the second embodiment of the present invention. The engine control processing in FIG. 10 is started when ignition of the vehicle is turned on and the power to the control device of the engine is turned on and the engine control processing is performed repeatedly. In addition, this engine control processing is executed while the vehicle travels.

Since the processing of steps S31 to S34 is the same as the processing of steps S1 to S4 in FIG. 3, respectively, the description thereof is omitted here and only the processing of step S35 and subsequent steps will be described. First, in step S35. PCM 50 decides whether it is a state in which vehicle posture control is not currently under execution. As a result of the decision, when vehicle posture control is under execution (No in step S35), the PCM 50 proceeds to step S37 and decides whether it is a state in which an F/C condition is not satisfied. Typically, when the accelerator opening obtained in step S1 is substantially 0 close), the PCM 50 decides that the F/C condition is satisfied (the F/C condition may be decided based on the throttle opening or the fuel injection amount in another example). As a result of the decision in step S37, when the F/C condition is satisfied (No in step S37), the PCM 50 proceeds to step S38 and suppresses the execution of F/C control. It should be noted here that a specific method for suppressing F/C control be described later.

In contrast, when vehicle posture control is not under execution (Yes in step S35) or when the F/C condition is not satisfied (Yes in step S37), the PCM 50 proceeds to step S36 and does not suppress the execution of F/C control.

After step S36 and step S38 described above, the PCM 50 proceeds to step S9 in FIG. 3 and performs the processing of steps S9 to S13 as in the first embodiment.

According to the second embodiment described above, the reduction of the engine torque due to F/C control can be appropriately suppressed during vehicle posture control. This can suppress the degradation of the controllability of vehicle posture control.

Next, specific examples (first to fourth examples) of the F/C control suppression method according to the second embodiment of the present invention will be described with reference to FIG. 11 to FIG. 13.

Figure 11:
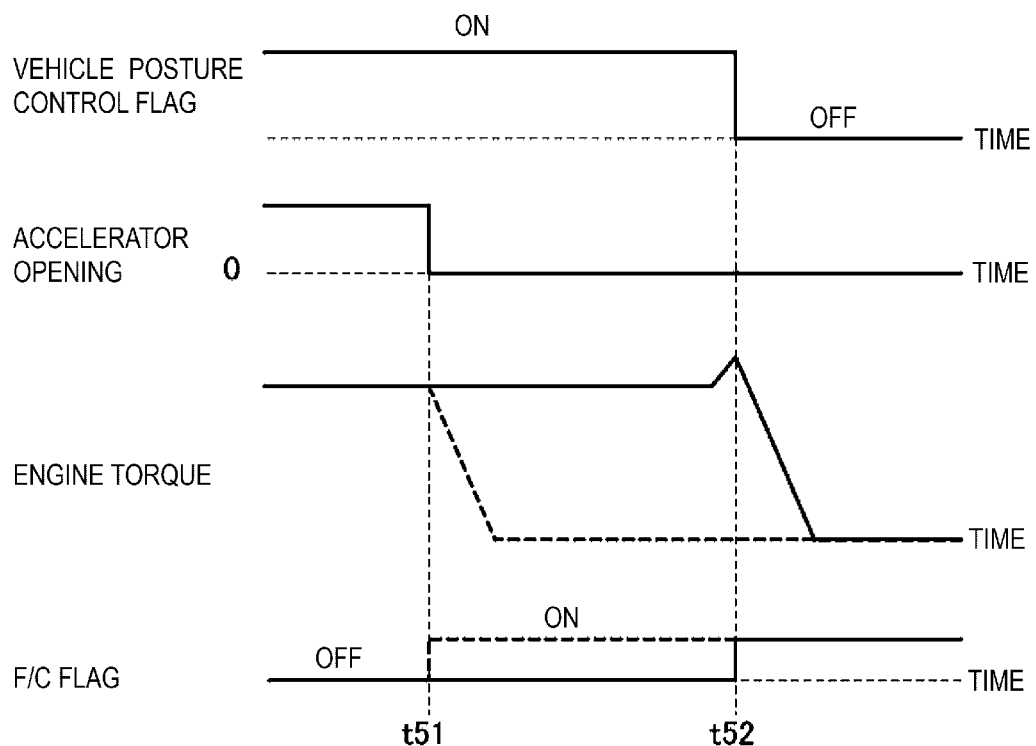
FIG. 11 is a timing chart illustrating a first example of a suppression method for F/C control according to the second embodiment of the present invention.

FIG. 11 is a timing chart illustrating a first example of the F/C control suppression method according to the second embodiment of the present invention. FIG. 11 illustrates, from top to bottom, temporal changes of the vehicle posture control flag, temporal changes of the accelerator opening, temporal changes of the engine torque, and temporal changes of an F/C flag (turned on when F/C control is under execution and turned off when F/C control is not under execution) indicating whether F/C control is under execution. In addition, in the graph indicating the engine torque and the F/C flag in FIG. 11, the solid line indicates a graph in the first example of the second embodiment and the dashed line indicates a graph in a comparative example. The comparative example is an example in which the F/C flag is turned on and F/C control is started immediately when the F/C condition is satisfied even during vehicle posture control.

As illustrated in FIG. 11, it is assumed that the vehicle posture control flag is turned on and the engine torque is reduced by vehicle posture control before time t151. In this situation, the accelerator opening is substantially 0 at time t51 and the F/C condition is satisfied. In the comparative example, from time t51, the F/C flag is turned on to immediately start F/C control for stopping fuel supply to the engine 10. As a result, the engine torque is quickly reduced from time t51.

In contrast, in the first example of the second embodiment, the PCM 50 suppresses F/C control since vehicle posture control is under execution at time t51 at which the F/C condition is satisfied. Particularly in the first example, the PCM 50 keeps the F/C flag off during vehicle posture control to prohibit F/C control (corresponding to the delaying of the start of F/C control). As a result, the engine torque reduced by vehicle posture control is kept. This can surely suppress the degradation of the controllability of vehicle posture control caused by the execution of F/C control. After that, since the vehicle posture control flag is turned off after time t52, the PCM 50 releases the prohibition of F/C control. Specifically, the PCM 50 turns on the F/C flag to start F/C control, that is, to stop the fuel supply to the engine 10. As a result, the engine torque is quickly reduced.

Figure 12:
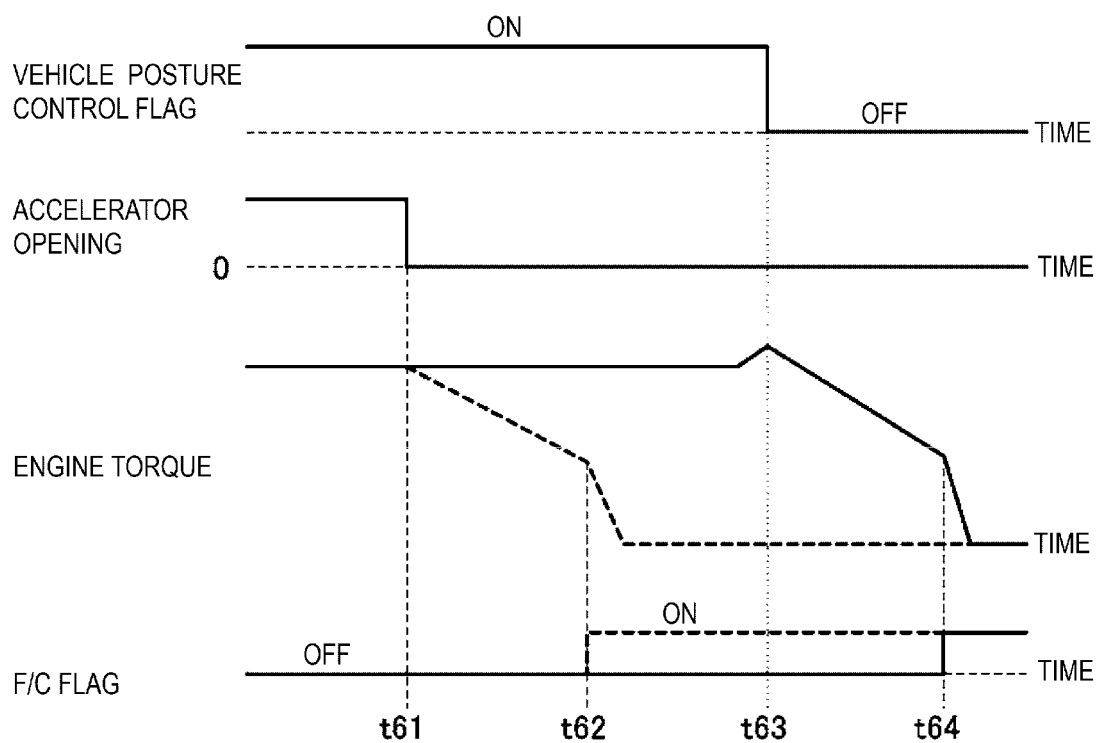
FIG. 12 is a timing chart illustrating a second example of the suppression method for F/C control according to the second embodiment of the present invention.

FIG. 12 is a timing chart illustrating a second example of the suppression method for F/C control according to the second embodiment of the present invention. FIG. 12 also illustrates, from top to bottom, temporal changes of the vehicle posture control flag, temporal changes of the accelerator opening, temporal changes of the engine torque, and temporal changes of the F/C flag. In addition, in the graph indicating the engine torque and the F/C flag in FIG. 12, the solid line indicates a graph in the second example of the second embodiment and the dashed line indicates a graph in the comparative example.

In the second example and comparative example, before F/C control for stopping fuel supply to the engine 10 is started, control for reducing the engine torque while keeping fuel supply to the engine 10 is performed. Specifically, the engine torque is reduced by performing control for gradually retarding the ignition timings by the ignition plugs 14. This is because a shock caused by a quick change of the torque due to F/C control is suppressed.

As illustrated in FIG. 12, it is assumed that the vehicle posture control flag is turned on and the engine torque is reduced by vehicle posture control before time t61. In this situation, the accelerator opening is substantially 0 at time t61 and the F/C condition is satisfied. In the comparative example, control for gradually retarding the ignition timing is started from time t61. As a result, the engine torque is calmly reduced. Then, at time t62 a predetermined time (for example, the time for which the retard amount of the ignition timing reaches substantially the retard limit) after starting the retarding of the ignition timing, the retarding of the ignition timing ends. In the comparative example, at time t62, the F/C flag is turned on to start. F/C control for stopping fuel supply to the engine 10. As a result, the engine torque is quickly reduced.

In contrast, in the second example of the second embodiment, since vehicle posture control is under execution at time t61 at which the F/C condition is satisfied, the PCM 50 suppresses the retarding of the ignition timing before F/C control. Particularly in the second example, the PCM 50 prohibits the retarding of the ignition timing (corresponding to the delaying of the start of the retarding of the ignition timing) during vehicle posture control. As a result, the engine torque reduced by vehicle posture control is kept. This can surely suppress the degradation of the controllability of vehicle posture control caused by the retarding of the ignition timing. After that, since the vehicle posture control flag is turned off at time t63, the PCM 50 releases the prohibition of the retarding of the ignition tuning and starts control for gradually retarding the ignition timing. As a result, the engine torque is calmly reduced. Then, the PCM 50 ends the retarding of the ignition timing at time t64 a predetermined time (for example, the time for which the retard amount of the ignition timing reaches substantially the retard limit) after the starting of retarding of the ignition timing. The PCM 50 turns on the F/C flag at time t64 to start the F/C control that stops fuel supply to the engine 10. As a result, the engine torque is quickly reduced.

Figure 13:
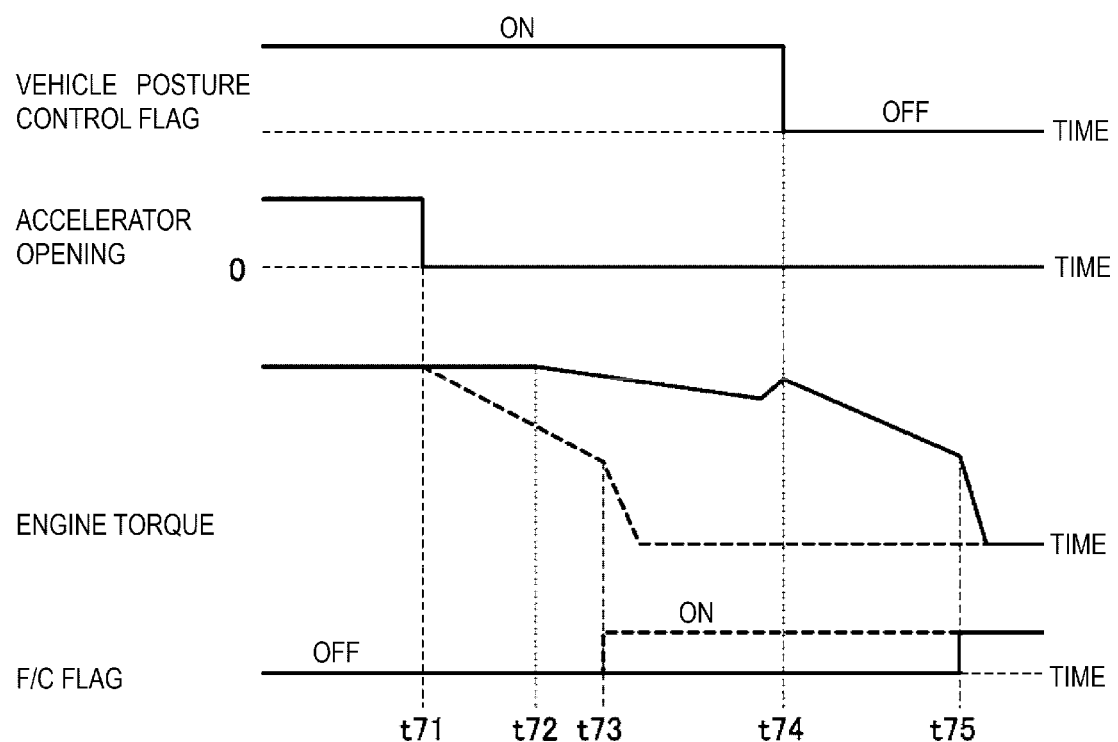
FIG. 13 is a timing chart illustrating a third example of the suppression d for F/C control according to the second embodiment of the present invention.

FIG. 13 is a timing chart illustrating a third example of the F/C control suppression method according to the second embodiment of the present invention. FIG. 13 also illustrates, from top to bottom, temporal changes of the vehicle posture control flag, temporal changes of the accelerator opening, temporal changes of the engine torque, and temporal changes of the F/C flag. In addition, in the graph indicating the engine torque and the F/C flag in FIG. 13, the solid line indicates a graph in the third example of the second embodiment and the dashed line indicates a graph in a comparative example. The control in the comparative example is the same as that illustrated in FIG. 12.

As illustrated in FIG. 13, it is assumed that the vehicle posture control flag is turned on and the engine torque is reduced by vehicle posture control before time t71. In this situation, the accelerator opening is substantially 0 at time t71 and the F/C condition is satisfied. Since the control in the comparative example in this case is the same as that illustrated in FIG. 12, the description thereof is omitted.

In the third example of the second embodiment, since vehicle posture control is under execution at time t71 at which the F/C condition is satisfied, the PCM 50 suppresses the retarding of the ignition timing before F/C control. Particularly in the third example, the PCM 50 makes the timing at which the retarding of the ignition timing is started later than in the comparative example. Specifically, the PCM 50 starts control for gradually retarding the ignition timing from time t72 some time after time t71 at which the F/C condition is satisfied. In addition, when retarding the ignition timing as described above, the PCM 50 makes the retard speed and the retard amount of the ignition timing smaller than in the comparative example. As a result, the reduction speed and the reduction amount of the engine torque become smaller than in the comparative example. This can suppress the degradation of the controllability of vehicle posture control while ensuring the reduction of the engine torque due to the retarding of the ignition timing before F/C control to some extent. After that, since the vehicle posture control flag is turned off at time t74, the PCM 50 performs control for releasing the suppression of the retarding of the ignition timing and retarding the ignition timing by the same retard speed and the same retard amount as in the comparative example. Then, the PCM 50 ends the retarding of the ignition timing at time t75 a predetermined time (for example, the time for which the retard amount of the ignition timing reaches substantially the retard limit) after starting the retarding of the ignition timing. The PCM 50 turns on the F/C flag to start F/C control for stopping fuel supply to the engine 10 at time t75. As a result, the engine torque is quickly reduced.

It should be noted here that the first to third examples of the second embodiment may be executed by combining them as appropriate. In particular, any two or more of elongating the time for which the ignition timing is retarded before F/C control, delaying the start of the retarding of the ignition timing, reducing the retard speed of the ignition timing, and reducing the retard amount of the ignition timing may be executed by combining them as appropriate.

<Modifications>

In the embodiments described above, when the driver performs an accelerator operation for reducing the accelerator opening (including an accelerator operation accompanied by the execution of fuel cut control) reduction of the engine torque due to the accelerator operation is suppressed uniformly. However, the reduction of the engine torque does not need to be suppressed uniformly. In another example, even during vehicle posture control, the engine torque may be reduced according to an accelerator operation by the driver depending on the driving situation.

For example, when the absolute value of the operation amount or the operation speed (typically, the operation amount or the operation speed during releasing of the depression of the accelerator) of the accelerator pedal by the driver is more than or equal to a predetermined value even during vehicle posture control, the reduction of the engine torque does not need to be suppressed. In addition, when the vehicle travels downhill (during downhill travel) even during vehicle posture control, the reduction of the engine torque does not need to be suppressed. In addition, even during vehicle posture control, while the transmission of the vehicle performs a shift to a lower gear or until a predetermined time elapses after the transmission performs the shift to the lower gear, the reduction of the engine torque does not need to be suppressed. In such a modification, the driver's will to decelerate the vehicle can be prioritized appropriately.

In addition, although suppression of the reduction of the engine torque due to the reduction of the accelerator opening is continued until vehicle posture control ends in the embodiments described above, the engine torque may be reduced by ending the suppression of the reduction of the engine torque due to the reduction of the accelerator opening halfway through vehicle posture control. This can also suppress the degradation of the controllability of vehicle posture control to some extent.

In addition, in the embodiments described above, vehicle posture control is performed based on the steering angle and the steering speed. In other examples, however, vehicle posture control may be performed based on the yaw rate or the lateral acceleration instead of the steering angle and the steering speed. The steering angle, the steering speed, the yaw rate, and the lateral acceleration correspond to examples of the "steering angle-related value" in the present invention.

In addition, the vehicle with the vehicle control device has the engine 10 that drives the driving wheels in the embodiments described above. However, in another example, the vehicle control device according to the present invention is applicable to a vehicle (typically, an HV vehicle or an EV vehicle) having a motor that drives the driving wheels using electric power supplied from a battery or capacitor. In this example, the controller 50 performs control that educes the torque of the motor as vehicle posture control (torque reduction control). In this example, the motor corresponds to the "driving source" in the present invention and various actuators that adjust the torque (output power) of the motor correspond to the "driving source control mechanism" in the present invention.

REFERENCE SIGNS LIST

1: intake passage
5: throttle valve
10: engine
13: fuel injection valve
14: ignition plug
18: variable intake valve mechanism
25: exhaust passage
30: accelerator opening sensor
39: vehicle speed sensor
40: steering angle sensor
50: PCM
100: engine system

The invention claimed is:

1. A vehicle control device comprising:
an engine;
an engine control mechanism that controls a generated torque of the engine; and
circuitry configured to perform vehicle posture control for generating vehicle deceleration by controlling the engine control mechanism to reduce the generated torque of the engine upon satisfaction of a condition that a vehicle is travelling and a steering angle-related value related to a steering angle of a steering device increases, wherein
when an accelerator operation for reducing an accelerator opening during execution of the vehicle posture control is performed, the circuitry is configured to suppress reduction of the generated torque of the engine due to the accelerator operation.

2. The vehicle control device according to claim 1, wherein
the circuitry is configured to perform control to continue suppressing the reduction of the generated torque due to the accelerator operation until the vehicle posture control ends.

3. The vehicle control device according to claim 1, wherein
the circuitry is configured to suppress the reduction of the generated torque due to the accelerator operation by at least one of prohibiting the reduction of the generated torque due to the accelerator operation, delaying a start of the reduction of the generated torque due to the accelerator operation, reducing a reduction speed of the generated torque due to the accelerator operation, and reducing a reduction amount of the generated torque due to the accelerator operation.

4. The vehicle control device according to claim 1, wherein
when the accelerator operation performed during the vehicle posture control is accompanied by execution of fuel cut control of the engine, the circuitry is configured to suppress the reduction of the generated torque due to the accelerator operation by suppressing the execution of the fuel cut control.

5. The vehicle control device according to claim 4, wherein the circuitry is configured to start the fuel cut control a predetermined time after an execution condition of the fuel cut control is satisfied, and when the accelerator operation is accompanied by the execution of the fuel cut control, if the accelerator operation is performed during the vehicle posture control, the circuitry is configured to suppress the reduction of the generated torque due to the accelerator operation by making the predetermined time longer than if the accelerator operation is not performed during the vehicle posture control.

6. The vehicle control device according to claim 5, wherein
the circuitry is configured to perform control for reducing the generated torque while keeping fuel supply to the engine until the predetermined time elapses after the execution condition of the fuel cut control is satisfied and, after the control, starts the fuel cut control, and when the accelerator operation is accompanied by the execution of the fuel cut control, if the accelerator operation is performed during the vehicle posture control, the circuitry is configured to suppress the reduction of the generated torque due to the accelerator operation by at least one of delaying a start of the reduction of the generated torque in the predetermined time, reducing a reduction speed of the generated torque in the predetermined time, and reducing a reduction amount of the generated torque in the predetermined time in addition to by making the predetermined time longer than if the accelerator operation is not performed during the vehicle posture control.

7. The vehicle control device according to claim 6, wherein
the circuitry is configured to not suppress the reduction of the generated torque due to the accelerator operation when an operation amount or an operation speed that corresponds to the accelerator operation is more than or equal to a predetermined value.

8. The vehicle control device according to claim 7, wherein
the circuitry is configured to not suppress the reduction of the generated torque due to the accelerator operation when the vehicle travels downhill.

9. The vehicle control device according to claim 1, wherein
the circuitry is configured to suppress the reduction of the generated torque due to the accelerator operation by at least one of prohibiting the reduction of the generated torque due to the accelerator operation, delaying a start of the reduction of the generated torque due to the accelerator operation; reducing a reduction speed of the generated torque due to the accelerator operation, and reducing a reduction amount of the generated torque due to the accelerator operation.

10. The vehicle control device according to claim 9, wherein
the circuitry is configured to not suppress the reduction of the generated torque due to the accelerator operation when an operation amount or an operation speed that corresponds to the accelerator operation is more than or equal to a predetermined value.

11. The vehicle control device according to claim 10, wherein
the circuitry is configured to not suppress the reduction of the generated torque due to the accelerator operation when the vehicle travels downhill.

12. The vehicle control device according to claim 11, wherein
the vehicle includes a transmission, and
the circuitry is configured to not suppress the reduction of the generated torque due to the accelerator operation while the transmission performs a shift to a lower gear or until a predetermined time elapses after the transmission performs the shift to the lower gear.

13. The vehicle control device according to claim 1, wherein
when the accelerator operation performed during the vehicle posture control is accompanied by execution of fuel cut control of the engine, the circuitry is configured to suppress the reduction of the generated torque due to the accelerator operation by suppressing the execution of the fuel cut control.

14. The vehicle control device according to claim 13, wherein
the circuitry is configured to start the fuel cut control a predetermined time after an execution condition of the fuel cut control is satisfied, and
when the accelerator operation is accompanied by the execution of the fuel cut control, if the accelerator operation is performed during the vehicle posture control, the circuitry is configured to suppress the reduction of the generated torque due to the accelerator operation by making the predetermined time longer than if the accelerator operation is not performed during the vehicle posture control.

15. The vehicle control device according to claim 14, wherein
the circuitry is configured to perform control for reducing the generated torque while keeping fuel supply to the engine until the predetermined time elapses after the execution condition of the fuel cut control is satisfied and, after the control, starts the fuel cut control, and
when the accelerator operation is accompanied by the execution of the fuel cut control, if the accelerator operation is performed during the vehicle posture control, the circuitry is configured to suppress the reduction of the generated torque due to the accelerator operation by at least one of delaying a start of the reduction of the generated torque in the predetermined time, reducing a reduction speed of the generated torque in the predetermined time, and reducing a reduction amount of the generated torque in the predetermined time in addition to by making the predetermined time longer than if the accelerator operation is not performed during the vehicle posture control.

16. The vehicle control device according to claim 1, wherein
the circuitry is configured to not suppress the reduction of the generated torque due to the accelerator operation when an operation amount or an operation speed that corresponds to the accelerator operation is more than or equal to a predetermined value.

17. The vehicle control device according to claim 1, wherein
the circuitry is configured to not suppress the reduction of the generated torque due to the accelerator operation when the vehicle travels downhill.

18. The vehicle control device according to claim 1, wherein
the vehicle includes a transmission, and
the circuitry is configured to not suppress the reduction of the generated torque due to the accelerator operation while the transmission performs a shift to a lower gear or until a predetermined time elapses after the transmission performs the shift to the lower gear.

19. A vehicle control device comprising:
an engine;
an engine control mechanism that controls a generated torque of the engine; and
circuitry configured to
perform vehicle posture control for generating vehicle deceleration by controlling the engine control mechanism to reduce the generated torque of the engine upon satisfaction of a condition that a vehicle is travelling and a steering angle-related value related to a steering angle of a steering device increases;
perform fuel cut control of the engine when a predetermined fuel cut condition is satisfied; and
suppress the execution of the fuel cut control when the predetermined fuel cut condition is satisfied during execution of the vehicle posture control.

20. A vehicle control device comprising:
an engine;
an engine control mechanism that controls a generated torque of the engine; and
circuitry configured to perform vehicle posture control for generating vehicle deceleration by controlling the engine control mechanism to reduce the generated torque of the engine upon satisfaction of a condition that a vehicle is travelling and a steering angle-related value related to a steering angle of a steering device increases, wherein,
when a request for reducing the generated torque of the engine is issued independently of the vehicle posture control during execution of the vehicle posture control, the circuitry is configured to suppress reduction of the generated torque of the engine based on the request.

* * * * *